(12) United States Patent
Schroeder

(10) Patent No.: US 7,079,726 B2
(45) Date of Patent: Jul. 18, 2006

(54) MICROELECTROMECHANICAL OPTICAL SWITCH USING BENDABLE FIBERS TO DIRECT LIGHT SIGNALS

(76) Inventor: Dale W. Schroeder, 1555 Tucker Rd., Scotts Valley, CA (US) 95066

( * ) Notice: Subject to any disclaimer, the term of this patent is extended or adjusted under 35 U.S.C. 154(b) by 114 days.

(21) Appl. No.: 10/638,174

(22) Filed: Aug. 7, 2003

(65) Prior Publication Data

US 2005/0031254 A1   Feb. 10, 2005

(51) Int. Cl.
*G02B 6/35* (2006.01)
(52) U.S. Cl. .................. 385/18; 385/16; 385/17; 385/19; 385/24
(58) Field of Classification Search ............ 385/24, 385/16, 17, 18, 19
See application file for complete search history.

(56) References Cited

U.S. PATENT DOCUMENTS

| | | | |
|---|---|---|---|
| 5,914,801 A | 6/1999 | Dhuler et al. | |
| 5,986,381 A | 11/1999 | Hoen et al. | |
| 5,998,906 A | 12/1999 | Jerman et al. | |
| 6,087,747 A | 7/2000 | Dhuler et al. | |
| 6,134,042 A | 10/2000 | Dhuler et al. | |
| 6,320,993 B1 * | 11/2001 | Laor | 385/16 |
| 6,362,556 B1 | 3/2002 | Hoen | |
| 6,445,844 B1 * | 9/2002 | Neukermans et al. | 385/18 |
| 6,545,385 B1 | 4/2003 | Miller et al. | |
| 2001/0017956 A1 * | 8/2001 | Goodman et al. | 385/16 |
| 2002/0181843 A1 * | 12/2002 | Vaganov | 385/17 |
| 2003/0210854 A1 * | 11/2003 | Tu | 385/18 |

* cited by examiner

*Primary Examiner*—John D. Lee
*Assistant Examiner*—James D. Stein

(57) ABSTRACT

An optical switch includes support devices to create bends in the flexible optical fibers. In accordance with the invention, the support devices may be fabricated to include one or more microelectromechanical system (MEMS) devices. The support devices may also be fabricated as a support plate connected to one or more MEMS devices. A MEMS device includes a pair of actuators, such as electrostatic actuators, to create a bend in a flexible optical fiber. Selectively actuating or rotating the support devices creates bends in the optical fibers, which direct a beam of light from an input optical fiber to a corresponding output optical fiber. The bends in the fibers provide maximum coupling of the light into an output fiber.

13 Claims, 8 Drawing Sheets

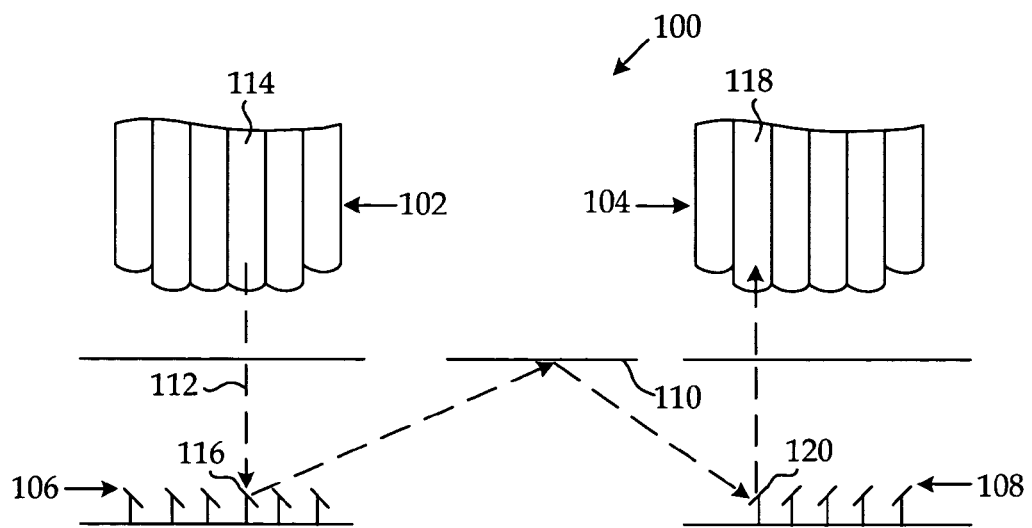
FIG. 1 - Prior Art
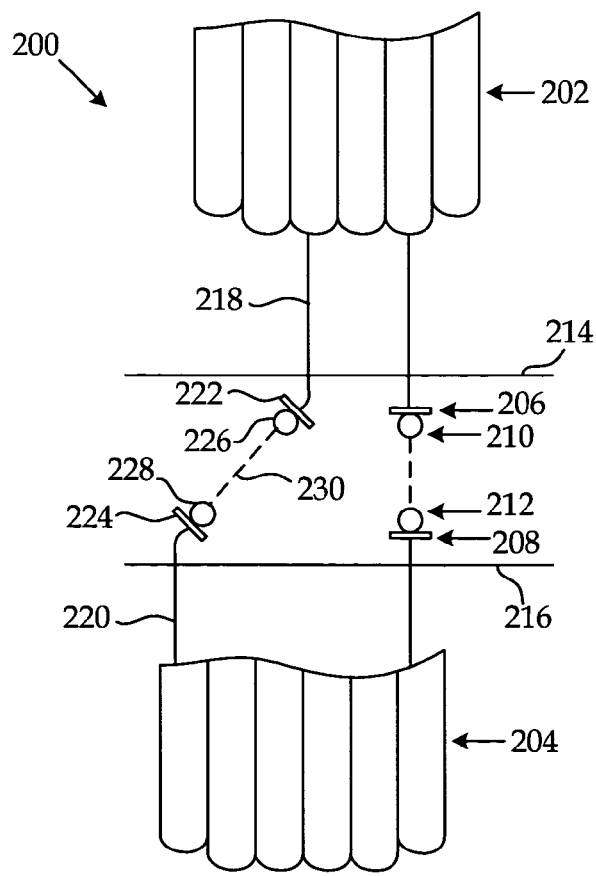
FIG. 2

MICROELECTROMECHANICAL OPTICAL SWITCH USING BENDABLE FIBERS TO DIRECT LIGHT SIGNALS

TECHNICAL FIELD

The invention relates generally to optical communications, and more particularly to optical switches. Still more particularly, the invention relates to a microelectromechanical optical switch using bendable fibers to direct light signals.

BACKGROUND

Recent and ongoing innovations in fiber optic technology have resulted in the increased use of optical fibers in a number of applications, including optical communications. This increased use has lead to a need for efficient peripheral devices that assist in the transmission of data through the optical fibers. One such peripheral device is the optical switch. An optical switch operates to selectively couple one optical fiber to a second optical fiber such that the coupled optical fibers are in communication with each other.

Two optical fibers in an optical switch can be coupled together with micro-machined tilting mirrors, or microelectromechanical system (MEMS) tilting mirrors, to direct a beam of light from an input optical fiber to an output optical fiber. FIG. 1 illustrates a simplified diagrammatic side view of an optical switch according to the prior art. The optical switch 100 includes input optical fibers 102, output optical fibers 104, two arrays of tilting mirrors 106, 108, and a fixed mirror 110. During the transmission of information through optical switch 100, a beam of light 112 is transmitted from an input fiber 114, reflected off tilting mirror 116, reflected off the fixed mirror 110, and directed to an output optical fiber 118 by tilting mirror 120. Although only one beam of light 112 is illustrated in FIG. 1, there are in actuality a number of beams of light propagating through optical switch 100 at any given time.

The alignment of the tilting mirrors is critical to the performance of an optical switch. Each tilting mirror must be precisely aligned to receive a beam of light from, or transmit a beam of light into, a corresponding optical fiber. When one or more tilting mirrors are out of alignment, less light enters an output optical fiber resulting in losses in optical signal power. One factor that increases the difficulty of aligning the arrays of tilting mirrors 106, 108 is the small acceptance angle of the output fibers 104. The beam of light 112 passes between the plurality of input optical fibers 102, the first and second arrays of tilting mirrors 106, 108, and the plurality of output optical fibers 108 in so-called free space, i.e. without passing through any physical medium other than gas. Thus, once the beam of light 112 reflects from a tilting mirror in the second array 108, the light cannot scatter much while the beam travels to the output fiber before an insufficient amount of light is input into the output optical fiber. The beam of light 112 must hit the input end of the output fiber very nearly directly in order to transmit a sufficient amount of light through the output optical fiber.

Another factor that increases the difficulty of maintaining alignment of the tilting mirrors is vibration. The first and second arrays of tilting mirrors 106, 108 cannot withstand much vibration and maintain their precise alignment. The alignment of one or more tilting mirrors in the first and second arrays 106, 108 can be lost when the vibration sustained by the optical switch 100 becomes too great.

SUMMARY

In accordance with the invention, embodiments of a microelectromechanical optical switch using bendable fibers to direct light signals are provided. The optical switch includes support devices to create bends in the flexible optical fibers. In accordance with the invention, the support devices may be fabricated to include one or more microelectromechanical system (MEMS) devices. Support devices may also be fabricated as a support plate connected to one or more MEMS devices. A MEMS device may include a pair of actuators, such as electrostatic actuators, to create a bend in a flexible optical fiber. Selectively actuating or rotating the support devices creates bends in the optical fibers, which direct a beam of light from an input optical fiber to a corresponding output optical fiber. The bends in the fibers provide maximum coupling of the light into an output fiber.

BRIEF DESCRIPTION OF THE DRAWINGS

The invention will best be understood by reference to the following detailed description of embodiments in accordance with the invention when read in conjunction with the accompanying drawings, wherein:

FIG. 1 illustrates a simplified diagrammatic side view of an optical switch according to the prior art;

FIG. 2 depicts a simplified diagrammatic side view of an optical switch in a first embodiment in accordance with the invention;

DETAILED DESCRIPTION

Figure 3:
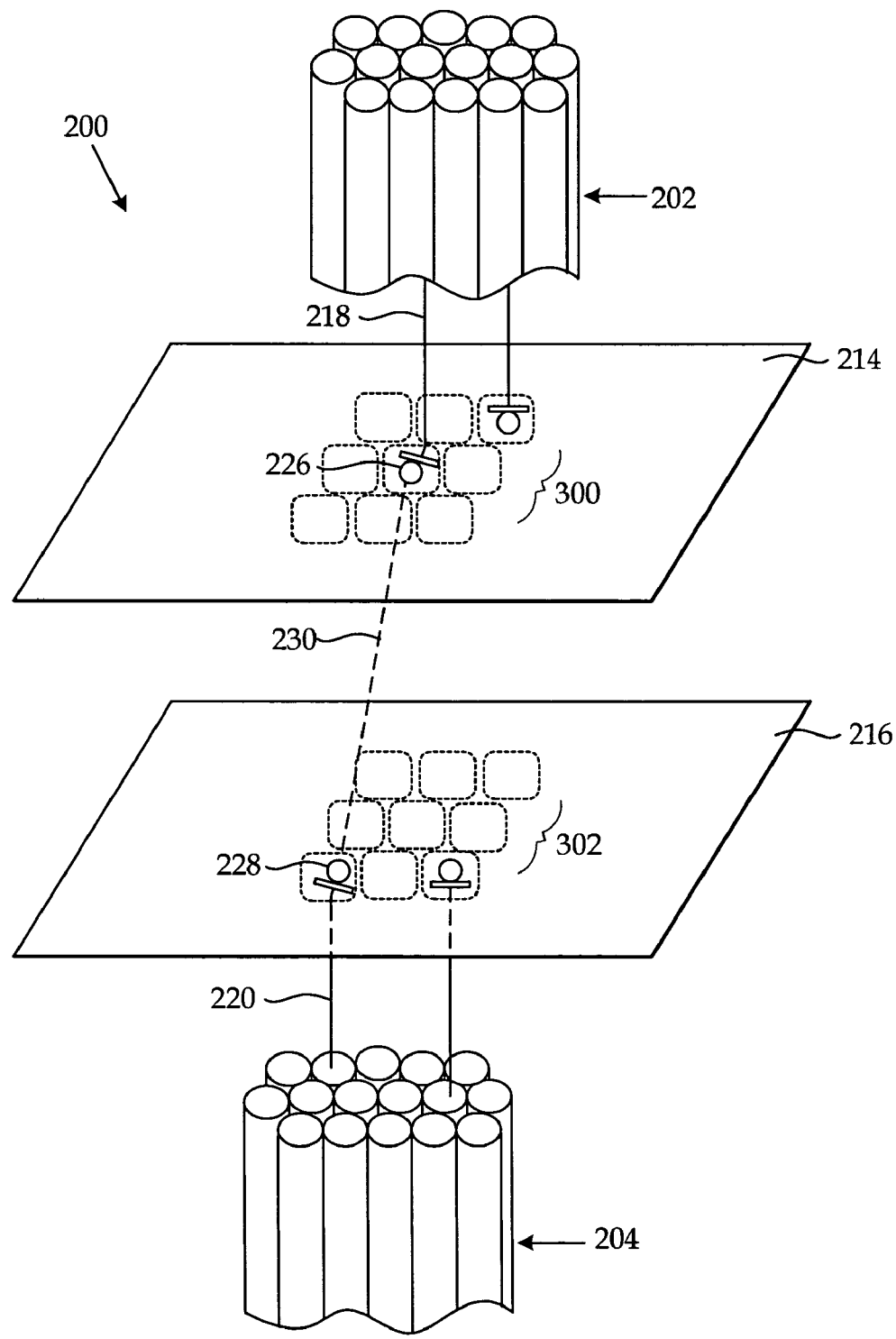
FIG. 3 illustrates a simplified perspective view of the optical switch of FIG. 2.

The invention relates to optical switches and switching systems using bendable fibers to direct light. The following description is presented to enable one skilled in the art to make and use the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

With reference now to the figures and in particular with reference to FIG. 2, a simplified diagrammatic side view of an optical switch in a first embodiment in accordance with the invention. Optical switch 200 includes input optical fibers 202, output optical fibers 204, input support devices 206, output support devices 208, input lenses 210, and output lenses 212. Optical switch 200 may be configured as an N×N switch, where N is an integer number. Alternatively, optical switch 200 may be configured as an N×M switch, where N represents the number of input fibers 202 and M the number of output fibers 204. N and M are integer numbers equaling one or greater. Thus, optical switch 200 may include one input fiber and one or more output fibers, or one output fiber and one or more input fibers, or any number of desired configurations of input and output fibers.

The input fibers 202 are bonded to, or supported by, a first substrate layer 214, and the output fibers 204 are bonded to, or supported by, a second substrate layer 216. In this embodiment in accordance with the invention, the input ends of the output fibers 204 are constructed in a plane opposing the output ends of the input fibers 202. Input and output fibers 202, 204 may be unidirectional or bi-directional optical fibers, and are constructed with any known flexible material, such as for example, RC 1550 specialty fiber by Corning® or BIF-RC-1550-L2 bend insensitive fibers by StockerYale™. The flexible material allows one or more bends to be formed in each fiber.

The support devices 206, 208 include positioning means that create bends in the flexible optical fibers. In this embodiment in accordance with the invention, support devices 206, 208 include microelectromechanical system (MEMS) devices. Support devices 206, 208 may be fabricated to include one or more MEMS devices, or may be fabricated as a support plate connected to one or more MEMS devices. A MEMS device in the FIG. 2 embodiment includes a pair of actuators, such as electrostatic actuators, thermal actuators, piezoelectric actuators, or electrostatic micromotors. The support devices 206, 208 are shown separately from the first and second substrate layers 214, 216 in order to better illustrate the support devices 206, 208. In practice, support devices 206 and 208 are typically formed or constructed within substrate layers 214 and 216, respectively, using known MEMS fabrication techniques.

An input fiber is optically coupled with an output fiber by selectively actuating or rotating one or both support devices to create a bend in one or both optical fibers and to place the lenses in the best position for transmitting or receiving a beam of light. A bend in a fiber may be created by applying the forces generated by one or more actuators against a band of material surrounding a portion of the exterior surface of a fiber, causing the fiber to flex toward a desired point. In another embodiment in accordance with the invention, a bend in a fiber may be created by applying the forces generated by one or more actuators to a support plate connected to the fiber, causing the support plate to rotate, or pivot, to a desired position. In other embodiments in accordance with the invention, support devices 206, 208 may be implemented using various other components and configurations that create one or more bends in the optical fibers.

For simplicity, input optical fiber 218 and output optical fiber 220 will be used to describe this embodiment in accordance with the invention. Input optical fiber 218 is optically coupled with the output optical fiber 220 by selectively actuating or rotating one or both support devices 222, 224 to create a bend in one or both optical fibers 218, 220 and to position lenses 226, 228 in the best position for transmitting or receiving the beam of light 230. The lenses 222, 224 are bonded to the fibers 218, 220 using any known bonding technique. Input lens 226 may also be bonded to, or in contact with, a support surface of support device 222. Similarly, output lens 228 may be bonded to, or in contact with, a support surface of support device 224. Lenses 226, 228 are implemented as ball lenses in the FIG. 2 embodiment, but may be implemented using any type of lens.

FIG. 3 illustrates a simplified perspective view of the optical switch of FIG. 2. Input substrate layer 214 and output substrate layer 216 each comprise a substrate layer in a monolithic silicon substrate in this embodiment in accordance with the invention. The outer sheath of the fibers 202, 204 may be chemically bonded within respective apertures 300, 302 fabricated in substrate layers 214, 216 by any known technique. For example, micro-machining may be employed to create apertures 300, 302 in substrate layers 214, 216. Alternatively, substrate layers 214, 216 may be etched using any appropriate etch technique. The outer sheaths of fibers 202, 204 may be bonded within apertures 300, 302 by any known chemical bonding process, including, but not limited to, chemical adhesives. Suitable adhesives include, but are not limited to, a two-part epoxy, a Group B epoxy such as a heat reactive epoxy, a preform epoxy, and a polymethylmethacrylate adhesive.

Although multiple beams of light are transmitted through optical switch 200 at any given time, only one beam of light 230 is shown in order to simplify the description. During the transmission of information through optical switch 200, the beam of light 230 is emitted from an output end of input fiber 218 and transmitted through input lens 226. Input lens 226 focuses the beam of light on output lens 228. Output lens 228 receives light beam 230 and focuses beam 230 into an input end of output fiber 220. A bend is created in input fiber 218 in order to direct light beam 230 from input lens 226 to output lens 228. Similarly, a bend is created in output fiber 220 in order to rotate output lens 228 to a position best suited for receiving light beam 230. The bends created in fibers 218, 220 provide maximum coupling of the light 230 into output fiber 220.

Figure 4:
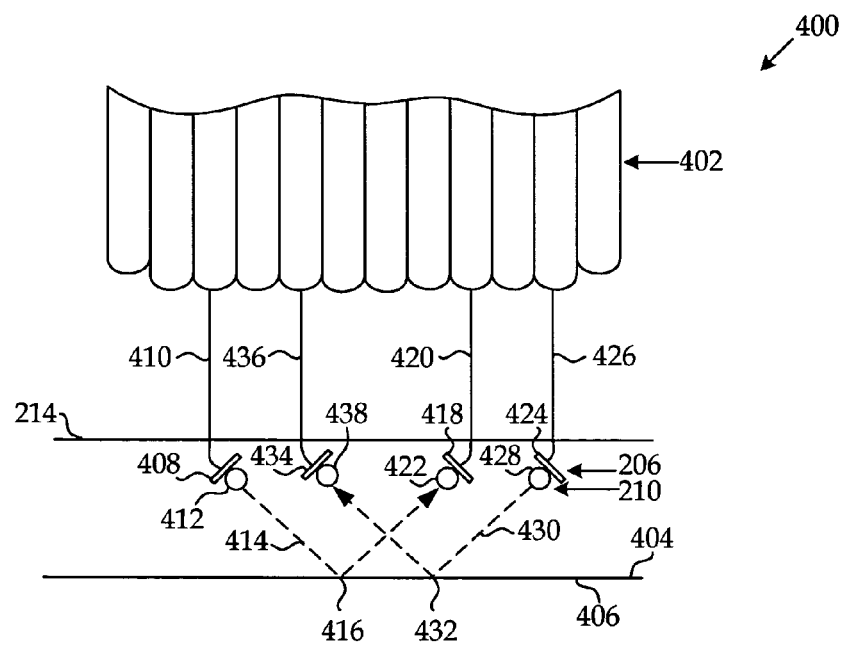
FIG. 4 depicts a simplified diagrammatic side view of an optical switch in a second embodiment in accordance with the invention.

Referring to FIG. 4, there is shown a simplified diagrammatic side view of an optical switch in a second embodiment in accordance with the invention. Optical switch 400 includes optical fibers 402, support devices 206, lenses 210, and an optical mirror 404. Optical fibers 402 are bonded to, or supported by, a first substrate layer 214 and the optical mirror 404 is constructed on an opposing second substrate layer 406. Optical switch 400 may be configured as an N×N switch or as an N×M switch, where N and M are integer numbers equaling one or greater. Thus, optical switch 400 may include one input fiber and one or more output fibers, or one output fiber and one or more input fibers, or any number of desired configurations of input and output fibers.

Optical mirror 404 is constructed as a flat mirror in this embodiment in accordance with the invention. In other embodiments in accordance with the invention, mirror 404 may comprise a concave mirror, a convex mirror, or an array of tilting mirrors provided on one or more substrate layers.

During the transmission of information through optical switch 400, a support device 408 may be selectively actuated or pivoted to create a bend in fiber 410 and to position lens 412 in the best position to focus a beam of light 414 onto a particular point 416 on the reflecting surface of mirror 404. A second support device 418 may also be selectively actuated or pivoted to create a bend in fiber 420 and to position lens 422 in the best position to receive the beam of light 414 after the beam of light has reflected off the surface of mirror 404.

Simultaneously, or at a later time, a third support device 424 may be selectively actuated or pivoted to create a bend in fiber 426 and to position lens 428 in the best position to focus a second beam of light 430 onto a particular point 432 on the surface of mirror 404. A fourth support device 434 may also be selectively actuated or pivoted to create a bend in fiber 436 and to position lens 438 in the best position to receive the beam of light 430 after the beam of light has reflected off the surface of mirror 404.

Figure 5:
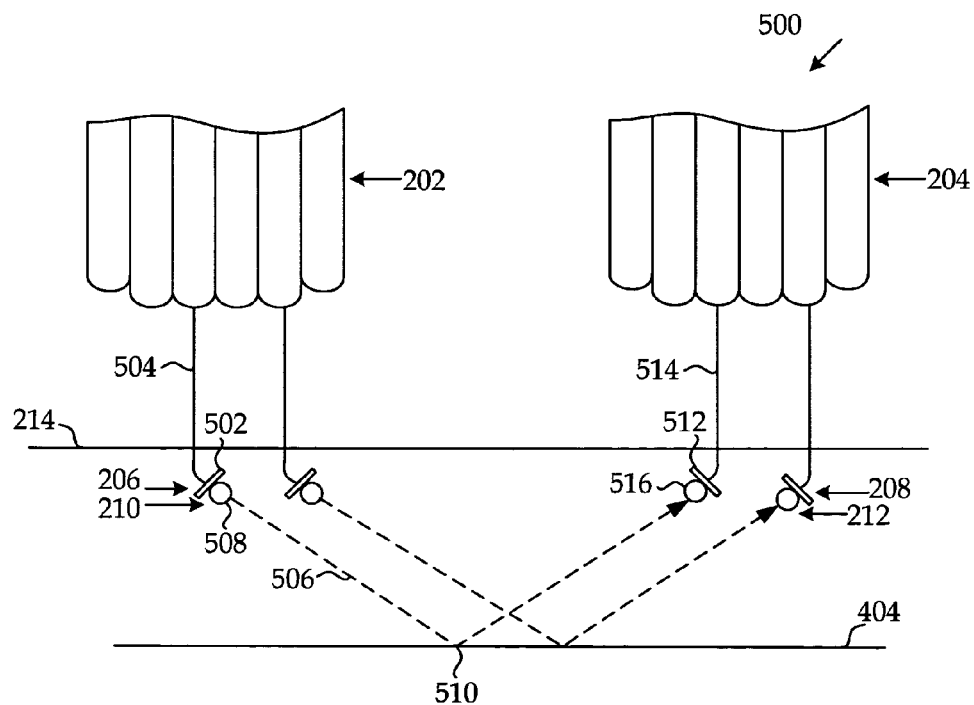
FIG. 5 illustrates a simplified diagrammatic side view of an optical switch in a third embodiment in accordance with the invention.

FIG. 5 illustrates a simplified diagrammatic side view of an optical switch in a third embodiment in accordance with the invention. Optical switch 500 includes input fibers 202, output fibers 204, input support devices 206, output support devices 208, input lenses 210, output lenses 212, and an optical mirror 404. Optical switch 500 may be configured as an N×N switch or as an N×M switch. N and M are integer numbers equaling one or greater. Thus, optical switch 500 may include one input fiber and one or more output fibers, or one output fiber and one or more input fibers, or any number of desired configurations of input and output fibers.

The operation of optical switch 500 is similar to the operation of optical switch 400 in FIG. 4. During the transmission of information through optical switch 500, a first input support device 502 may be selectively actuated or pivoted to create a bend in input fiber 504 and to focus a beam of light 506 transmitted through input lens 508 onto a particular point 510 on the reflecting surface of mirror 404. An output support device 512 may also be selectively actuated or pivoted in order to create a bend in fiber 514 and to position output lens 516 in the best position to receive the beam of light 506 after the beam of light has reflected off the surface of mirror 404.

Figure 6A:
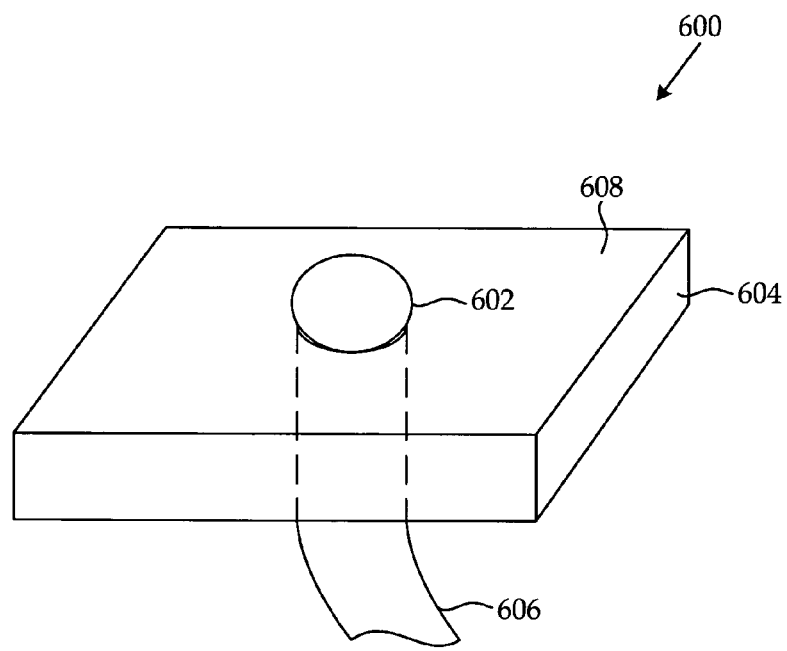
FIG. 6A depicts a simplified perspective view of a first lens, support device, and fiber construction that may be utilized in the optical switches of FIGS. 2, 4, and 5.

Referring to FIG. 6A, there is shown a simplified perspective view of a first lens, support device, and fiber construction that may be utilized in the optical switches of FIGS. 2, 4, and 5. Construction 600 includes a lens 602, a support device 604, and an optical fiber 606. Lens 602 is bonded to, or in contact with, a support surface 608 of support device 604 in this embodiment in accordance with the invention. Lens 602 is also aligned over, and bonded to, a terminating end of optical fiber 606.

Figure 6B:
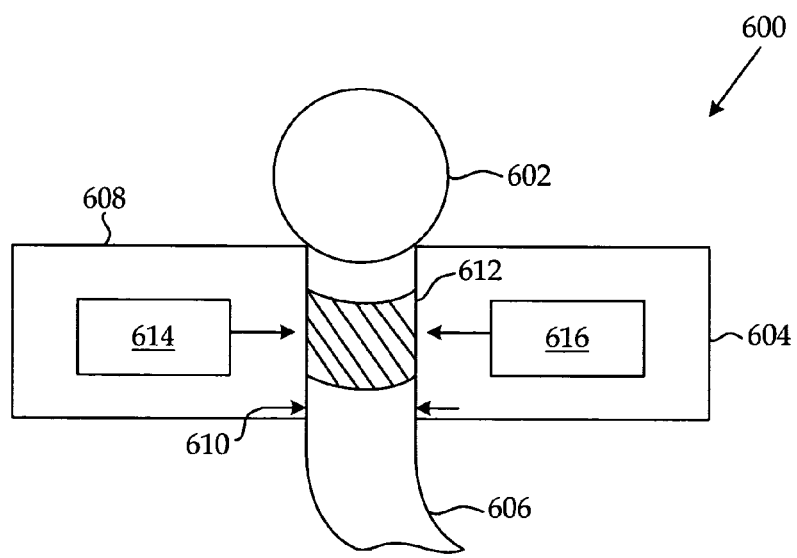
FIG. 6B depicts a side view of the first lens, support device, and fiber construction of FIG. 6A.

FIG. 6B depicts a side view of the first lens, support device, and fiber construction of FIG. 6A. Optical fiber 606 extends through an aperture 610 formed in support device 604. Aperture 610 may be created using any known fabrication technique. For example, aperture 610 may be formed in support device 604 by micro-machining the substrate or by etching the substrate using any suitable etch technique.

Support device 604 includes two MEMS devices, such as electrostatic actuators, in accordance with the invention. One actuator 614 generates a force along a first axis while the second actuator 616 generates a force along a second, perpendicular axis. The two actuators 614, 616 permit three-dimensional flexing of the optical fiber 606 and positioning of the lens 602. A bend in fiber 606 may be created by applying the forces generated by one or both actuators against a band of material 612 surrounding a portion of the exterior surface of the fiber 606, causing the fiber 606 to flex toward a desired point.

Embodiments in accordance with the invention are not limited in application to the construction shown in FIGS. 6A and 6B. Any support device construction that permits a force to be applied to the exterior surface of a flexible optical fiber in order to flex the optical fiber towards a desired point may be utilized in other embodiments in accordance with the invention.

Figure 7:
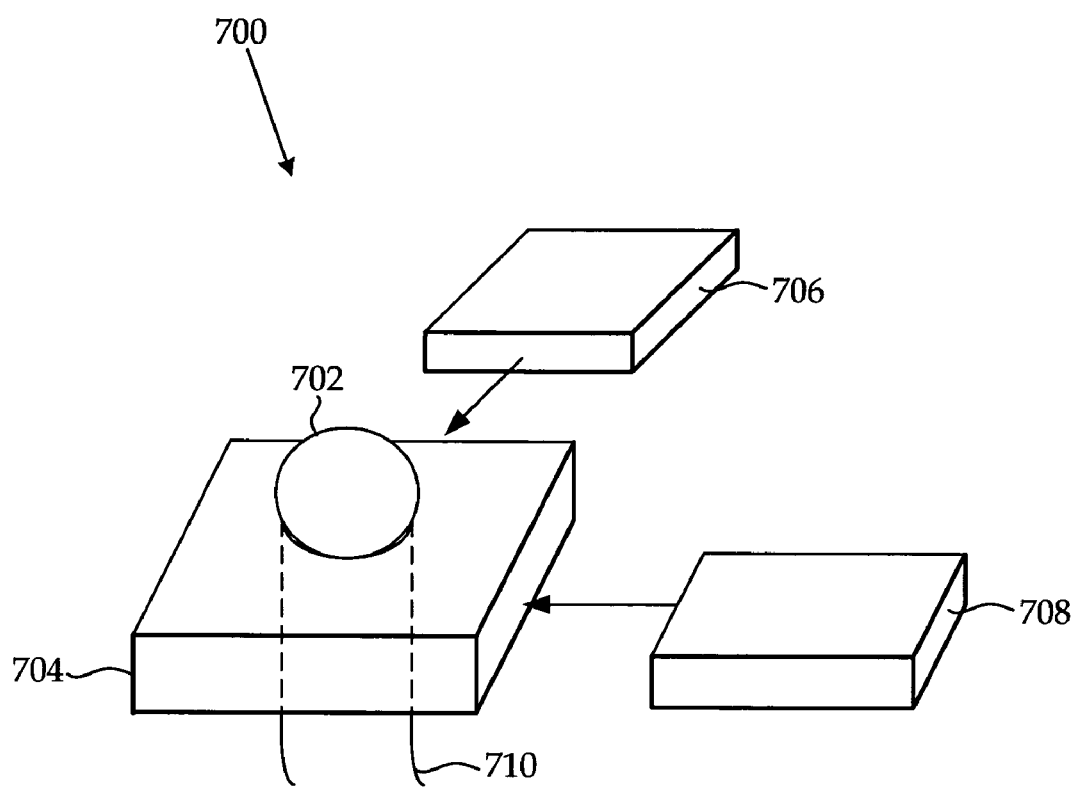
FIG. 7 illustrates a simplified perspective view of a second lens, support device, and fiber construction that may be utilized in the optical switches of FIGS. 2, 4, and 5.

Referring to FIG. 7, there is shown a simplified perspective view of a second lens, support device, and fiber construction that may be utilized in the optical switches of FIGS. 2, 4, and 5. Construction 700 includes a lens 702, a support plate 704, positioning means 706, positioning means 708, and an optical fiber 710. Support plate 704, first positioning means 706, and second positioning means 708, form a support device in this embodiment in accordance with the invention. Positioning means 706 and 708 each include a MEMS device, such as an electrostatic actuator. A bend in the optical fiber 710 is created by applying the forces generated by one or both actuators against the support plate 704 connected to the fiber 710, causing the support plate 704 to rotate, or pivot, to a desired position. Rotation of the support plate 704 permits three-dimensional flexing of the fiber 710 and positioning of the lens 702.

Embodiments in accordance with the invention are not limited in application to the construction shown in FIG. 7. Any support device construction that permits a force to be applied to a support plate affixed or connected to a flexible optical fiber in order to create a bend in the fiber may be utilized in other embodiments in accordance with the invention.

Figure 8:
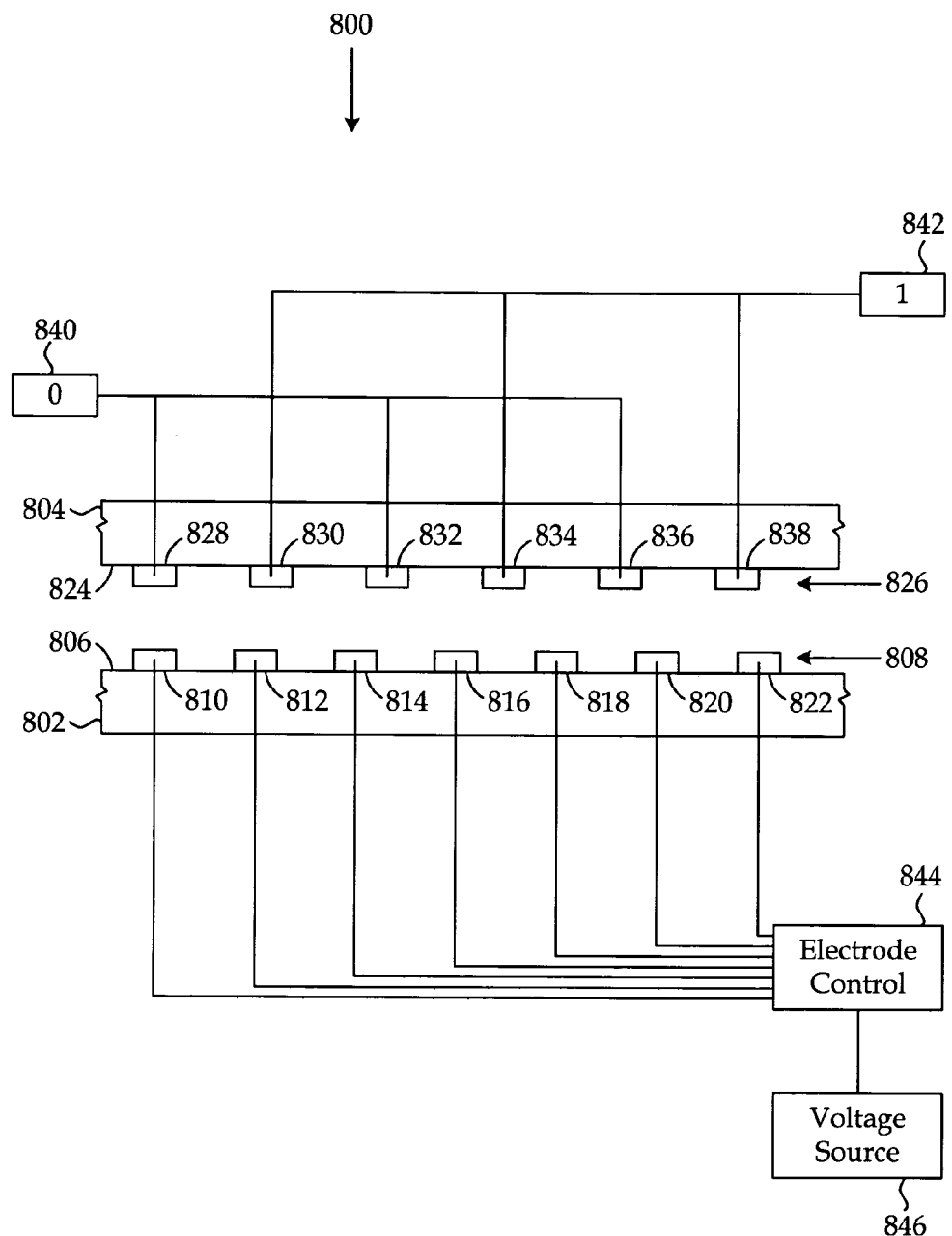
FIG. 8 depicts a schematic side view of an electrostatic actuator that may be utilized in the constructions of FIGS. 6B and 7.

FIG. 8 depicts a schematic side view of an electrostatic actuator that may be utilized in the constructions of FIGS. 6B and 7. The electrostatic actuator is disclosed in commonly assigned U.S. Pat. No. 5,986,381. The electrostatic actuator 800 includes a stator 802 and a rotor 804. Stator 802 includes the plane-opposed surface 806 along which the linear array 808 of stator electrodes 810, 812, 814, 816, 818, 820, and 822 is disposed. The rotor 804 includes the plane-opposed surface 824 along which the linear array 826 of rotor electrodes 828, 830, 832, 834, 836 and 838 is disposed.

The rotor 804 is supported relative to the stator 802 so that the opposed surface 806 of the stator 802 is spaced apart from the opposed surface 824 of the rotor 804. The voltage pattern on the linear array 826 of rotor electrodes is static and strictly alternating, and is applied by connecting the voltage source 840 to the alternate electrodes 828, 832, and 836, and by connecting the voltage source 842 to the electrodes 830, 834, and 838, adjacent to electrodes 828, 832, and 836, respectively.

A substantially alternating pattern of voltages is applied to the stator electrodes 810–822 through an electrode control 844 and a voltage source 846. In the embodiment of FIG. 8, the alternating voltage pattern are created by applying a voltage level 1 to electrodes 810, 814, 818, 822, and a voltage level 0 to adjacent electrodes 812, 816, 820.

Figure 9:
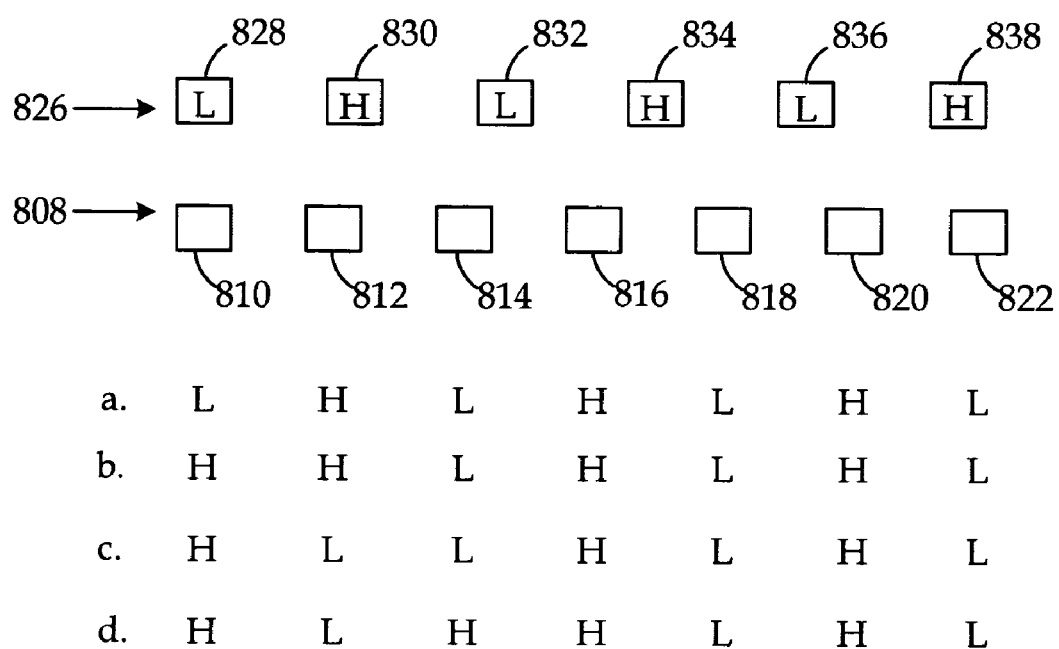
FIG. 9 illustrates voltage states for generating the stepping actuation with the electrostatic actuator of FIG. 8.

The electrostatic actuator 800 is capable not only of generating a sizable lateral force, but also as operating as a stepping motor. FIG. 9 illustrates voltage states for generating the stepping actuation with the electrostatic actuator of FIG. 8. The stable in-plane position of the rotor 804 is changed by creating a local disruption in the alternating voltage pattern applied to the array of electrodes on either the rotor 804 or the stator 802. The alternating voltage pattern applied to the other array of electrodes remains unchanged.

FIG. 9 schematically shows an example of the alternating voltage patterns applied to the array 826 of rotor electrodes and the array 808 of stator electrodes. The letters "L" and "H" indicate the low and high voltage states, respectively. Since the voltage states applied to the electrodes in array 808 change, the voltage states of the electrodes in four consecutive steps of stepping the rotor position are shown in the steps marked (a) through (d) in the figure.

Array 826 has a fixed alternating voltage pattern of low and high voltage states. The initial pattern of voltage states in array 808 is shown in step (a) in FIG. 9. In this step alternate electrodes have the same voltage state and adjacent electrodes have opposite voltage states, so the initial voltage pattern is the alternating voltage pattern described with reference to FIG. 8. In-plane movement of the rotor is obtained by applying a sequentially moving local disruption to the alternating voltage pattern on array 808. The sequentially moving local disruption is applied by changing the voltage state of one of the electrodes in array 808. The position of the electrode whose voltage state is changed is sequentially shifted along the array 808. In the FIG. 9 embodiment, the local disruption shifts from left to right.

The alternating voltage pattern on array 808 is locally disrupted by switching electrode 810 from the low voltage state to a high voltage state. The voltage states of the remaining six electrodes 812–822 are unchanged. The resulting pattern of voltage states is shown in step (b) in FIG. 9. Locally disrupting the alternating voltage pattern on the array 808 by switching the voltage state of the electrode 810 generates an in-plane force that drives the rotor 804 one step to the left in the in-plane direction.

To move the rotor 804 a second step to the left in the in-plane direction, the local disruption in the alternating voltage pattern on array 808 is shifted by one electrode to the right by switching electrode 812 from the high voltage state to the low voltage state. The voltage states of the remaining six electrodes 810, 814, 816, 818, 820, 822 remain unchanged. The resulting voltage pattern is shown in step (c) of FIG. 9.

To move the rotor 804 a third step to the left in the in-plane direction, the local disruption in the alternating voltage pattern on array 808 is shifted by one further electrode to the right by switching electrode 814 from the low voltage state to the high voltage state. The voltage states of the remaining six electrodes 810, 812, 816, 818, 820, 822 remain unchanged. The resulting voltage pattern is shown in step (d) of FIG. 9.

To continue moving the rotor 804 additional steps to the left, the local disruption in the alternating voltage pattern on array 808 is continually shifted by one electrode. The alternating voltage pattern on array 808 will return to an undisrupted alternating voltage pattern when the voltage states of electrodes 810–822 differ from the undisrupted alternating voltage pattern in step (a) only in that the high and low voltage states are interchanged. The next step to the left switches the voltage state of electrode 810 from a high to a low voltage state and the process of local disruption repeats. In this manner the stepper motor continues its stepping action.

Figure 10:
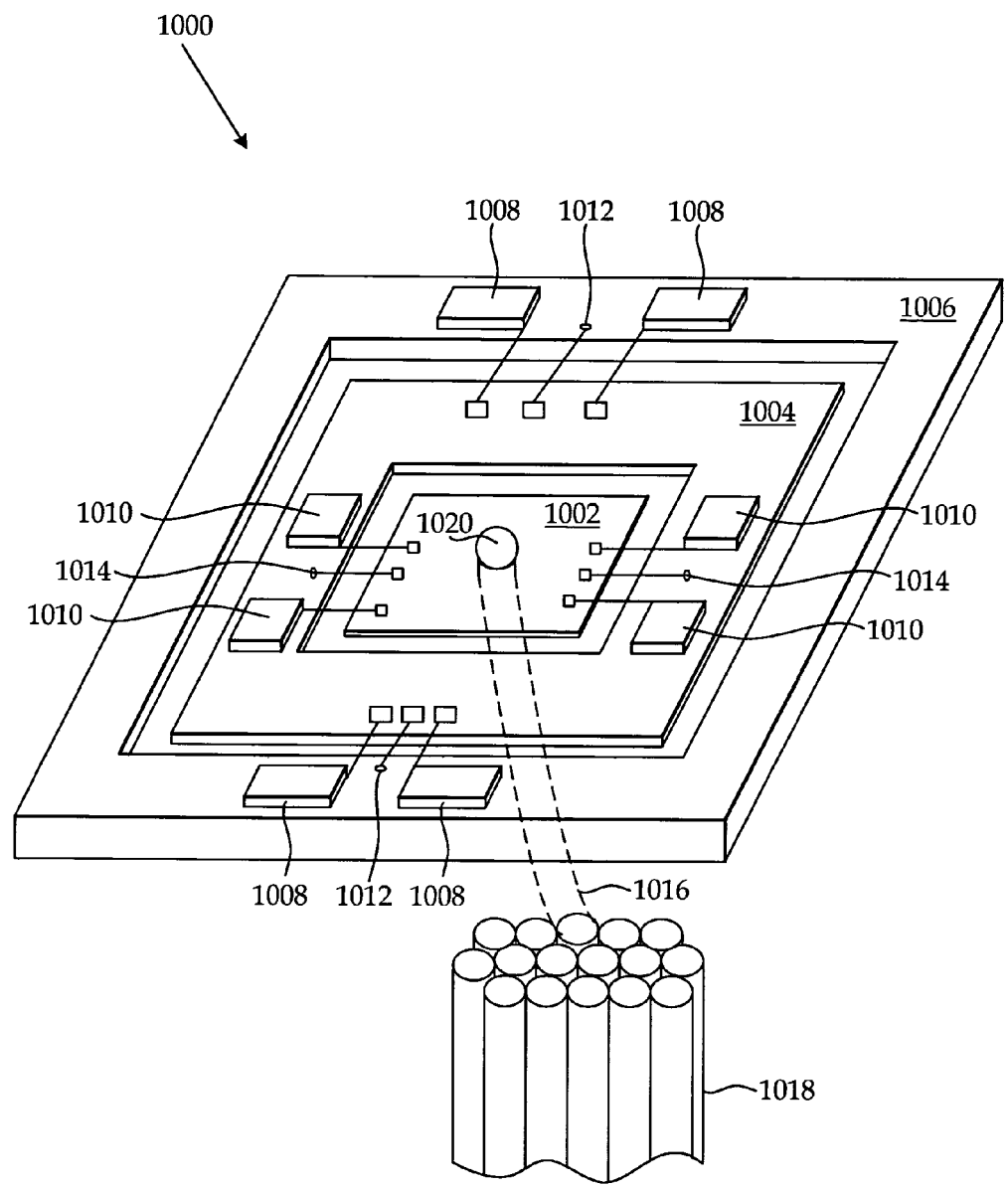
FIG. 10 depicts a simplified perspective view of a movable support device that may be utilized in the optical switches of FIGS. 2, 4, and 5.

Referring to FIG. 10, there is shown a simplified perspective view of a movable support device that may be utilized in the optical switches of FIGS. 2, 4, and 5. Movable support device 1000 includes, but is not limited to, a support plate 1002, an inner frame 1004, an outer frame 1006, a plurality of actuators 1008, 1010, and a plurality of beams 1012, 1014. The construction of movable support device 1000 is similar to the construction disclosed in U.S. Pat. No. 5,914,801. Support plate 1002 is carried for rotation about a first axis (e.g. x axis) relative to inner frame 1004 using a first pair of beams 1014. In the FIG. 10 embodiment, beams 1014 are fixed to support plate 1002 and extend out from opposing sides of the support plate 1002 to be positioned adjacent to the surface of inner frame 1004. Support plate 1002 and the pair of beams 1014 may be formed from a single layer of a material, such as polysilicon, so that the beams 1014 and support plate 1002 are confined within a single plane.

Inner frame 1004 is carried for rotation about a second, perpendicular axis (e.g. y axis) relative to outer frame 1006 using a second pair of beams 1012. The pair of beams 1012 and the inner frame 1004 may be constructed in a manner similar to construction of support plate 1002 and beams 1014. Additionally, beams 1012 and inner frame 1004 may also be formed from a single layer of a material so that the beams 1012 and inner frame 1004 are confined within a single plane.

A first set of four actuators 1008 is provided on outer frame 1006 and generate the mechanical force for rotating the inner frame 1004 relative to the outer frame 1006. A second set of four actuators 1010 is provided on inner frame 1004 and generate the mechanical force for rotating the support plate 1002 relative to the inner frame 1004. Accordingly, support plate 1002 can rotate independently about both the first axis of rotation and the second, perpendicular axis of rotation, thereby allowing three-dimensional positioning of support plate 1002.

A fiber 1016 included in the plurality of fibers 1018 extends through an aperture (not shown) formed in support plate 1002. Affixed to the end of fiber 1016, and supported by support plate 1002, is a lens 1020. Fiber 1016 may be bonded within the aperture, and lens bonded to the end of fiber 1016, using any known appropriate bonding technique. A bend is created in fiber 1016 by rotating support plate 1002. The actuators 1008, 1010 generate the mechanical forces needed to rotate support plate 1002 in order to create the proper bend in fiber 1016 and to position lens 1020 in the best position to transmit or receive a beam of light (not shown).

Embodiments in accordance with the invention are not limited in application to the construction shown in FIG. 10. Any construction that can create a bend in an optical fiber by applying a force against the exterior surface of the fiber, or by applying a force to a support plate connected to the fiber, may be used with other embodiments in accordance with the invention.

The invention claimed is:

1. An optical switch comprising:
  an optical channel, wherein the optical channel comprises:
    an input optical fiber for receiving a beam of light;
    an output optical fiber, wherein the input and output optical fibers are included in a single bundle of optical fibers;
    a first support device connected to the input optical fiber and operable to apply one or more forces directly to the input optical fiber for creating a bend in the input optical fiber;
    a second support device connected to the output optical fiber and operable to apply one or more forces directly to the output optical fiber for creating a bend in the output optical fiber; and
    a mirror positioned opposite the input optical fiber and the output optical fiber for receiving the beam of light from the input optical fiber and for reflecting the beam of light to the output optical fiber, wherein the bends in the input and output optical fibers direct the beam of light from the input optical fiber to the mirror to the output optical fiber.

2. The optical switch of claim 1, wherein the first support device comprises a first pair of actuators, wherein a first actuator in the first pair of actuators generates a first force along a first axis and a second actuator in the first pair of actuators generates a second force along a second, perpendicular axis to create the bend in the input optical fiber.

3. The optical switch of claim 2, wherein the second support device comprises a second pair of actuators, wherein a third actuator in the second pair of actuators generates a third force along a first axis and a fourth actuator in the second pair of actuators generates a fourth force along a second, perpendicular axis to create the bend in the output optical fiber.

4. An optical switch, comprising:
   a plurality of input optical fibers each for receiving a beam of light;
   a plurality of output optical fibers, wherein the plurality of input optical fibers and the plurality of output optical fibers are included in a single bundle of optical fibers;
   a mirror positioned opposite the plurality of input optical fibers and the plurality of output optical fibers;
   a first array of support devices each connected to a respective one of the input optical fibers and operable to apply one or more forces directly to the respective input optical fiber, wherein the support devices in the first array create bends in respective input optical fibers; and
   a second array of support devices each connected to a respective one of the output optical fibers and operable to apply one or more forces directly to the respective output optical fiber, wherein the support devices in the second array create bends in respective output optical fibers, wherein the bends in the input and output optical fibers direct the beams of light from the input optical fibers to the mirror to respective output optical fibers.

5. The optical switch of claim 4, wherein each support device in the first array of support devices comprises a first pair of actuators, wherein a first actuator in each pair of actuators generates a first force along a first axis and a second actuator in each first pair of actuators generates a second force along a second, perpendicular axis.

6. The optical switch of claim 5, wherein each support device in the second array of support devices comprises a second pair of actuators, wherein a third actuator in each second pair of actuators generates a third force along a first axis and a fourth actuator in each second pair of actuators generates a fourth force along a second, perpendicular axis.

7. The optical switch of claim 6, further comprising:
   a first plurality of bands of material wherein each band of material in the first plurality surrounds a portion of an exterior surface of a respective one of the input optical fibers; and
   a second plurality of bands of material wherein each band of material in the second plurality surrounds a portion of an exterior surface of a respective one of the output optical fibers.

8. The optical switch of claim 7, wherein the first and second forces generated by each first pair of actuators are applied to a respective one of the bands of material in the first plurality to create a bend in a respective one of the input optical fibers.

9. The optical switch of claim 8, wherein the third and fourth forces generated by each second pair of actuators are applied to a respective one of the bands of material in the second plurality to create a bend in a respective one of the output optical fibers.

10. A method for directing a beam of light from an input optical fiber to an output optical fiber in an optical switch, wherein the input optical fiber and the output optical fiber are included in a single bundle of optical fibers, the method comprising the steps of:
    transmitting the beam of light into the input optical fiber;
    selectively actuating a first support device connected to the input optical fiber to apply a force directly to the input optical fiber to create a bend in the input optical fiber;
    selectively actuating a second support device connected to the output optical fiber to apply one or more forces directly to the output optical fiber to create a bend in the output optical fiber; and
    reflecting the beam of light off a mirror positioned opposite the input optical fiber and the output optical fiber, wherein the bends in the input and output optical fibers direct the beam of light from the input optical fiber to the mirror to the output optical fiber.

11. The method of claim 10, wherein the step of selectively actuating a first support device connected to the input optical fiber to one or more forces directly to the input optical fiber to create a bend in the input optical fiber comprises selectively actuating a first actuator and a second actuator to create a bend in the input optical fiber, wherein the first actuator generates a first force along a first axis and the second actuator generates a second force along a second, perpendicular axis.

12. The method of claim 11, wherein the step of selectively actuating a second device connected to the output optical fiber to one or more forces directly to the output optical fiber to create a bend in the output optical fiber comprises selectively actuating a third actuator and a fourth actuator to create a bend in the output optical fiber, wherein the third actuator generates a third force along a first axis and the fourth actuator generates a fourth force along a second, perpendicular axis.

13. The method of claim 12, wherein the first and second forces generated by the first and second actuators are applied to a first band of material surrounding a portion of an exterior surface of the input optical fiber and the third and fourth forces generated by the third and fourth actuators are applied to a second band of material surrounding a portion of an exterior surface of the output optical fiber.

* * * * *